United States Patent
Hasegawa et al.

(10) Patent No.: US 9,341,906 B2
(45) Date of Patent: *May 17, 2016

(54) LIQUID CRYSTAL DISPLAY DEVICE

(71) Applicant: Japan Display Inc., Minato-ku (JP)

(72) Inventors: Hitomi Hasegawa, Saitama-ken (JP); Nobuko Fukuoka, Saitama-ken (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,376

(22) Filed: Jul. 16, 2015

(65) Prior Publication Data

US 2015/0323846 A1 Nov. 12, 2015

Related U.S. Application Data

(62) Division of application No. 13/763,888, filed on Feb. 11, 2013, now Pat. No. 9,122,111.

(30) Foreign Application Priority Data

Mar. 28, 2012 (JP) ................................. 2012-075083

(51) Int. Cl.
*G02F 1/1343* (2006.01)
*G02F 1/1362* (2006.01)
(Continued)

(52) U.S. Cl.
CPC ........ *G02F 1/136286* (2013.01); *G02F 1/1337* (2013.01); *G02F 1/1368* (2013.01); *G02F 1/133528* (2013.01); *G02F 1/133707* (2013.01); *G02F 1/134309* (2013.01);
(Continued)

(58) Field of Classification Search
CPC ................................................ G02F 1/134336
See application file for complete search history.

(56) References Cited

U.S. PATENT DOCUMENTS 6,266,116 B1 7/2001 Ohta et al.
8,885,132 B2 11/2014 Morita et al.
(Continued)

FOREIGN PATENT DOCUMENTS

JP 6-160878 6/1994
JP 6-222397 8/1994
(Continued)

OTHER PUBLICATIONS

English translation of Office Action issued Apr. 21, 2015 in Japanese Patent Application No. 2012-075083.

*Primary Examiner* — Timothy L Rude
(74) *Attorney, Agent, or Firm* — Oblon, McClelland, Maier & Neustadt, L.L.P.

(57) ABSTRACT

In one embodiment, a first substrate includes a gate line extending in a first direction, a source line extending in a second direction orthogonally crossing the first direction, a pixel electrode including a main pixel electrode extending in the second direction, and a first alignment film covering the pixel electrode. A second substrate includes a common electrode having a pair of main common electrodes arranged on both sides sandwiching the main pixel electrode and a second alignment film covering the common electrode. A liquid crystal layer is held between the first alignment film and the second alignment film and includes liquid crystal molecules. The liquid crystal layer is formed of materials having negative dielectric constant anisotropy, and the liquid crystal molecules are initially aligned substantially in parallel with the first direction when electric field is not impressed between the pixel electrode and the common electrode.

11 Claims, 8 Drawing Sheets

(51) Int. Cl.
*G02F 1/1337* (2006.01)
*G02F 1/1368* (2006.01)
*G02F 1/1335* (2006.01)

(52) U.S. Cl.
CPC ... *G02F 1/134336* (2013.01); *G02F 1/134363* (2013.01); *G02F 1/136213* (2013.01); *G02F 2001/133531* (2013.01); *G02F 2001/133757* (2013.01); *G02F 2001/134318* (2013.01); *G02F 2001/134345* (2013.01); *G02F 2001/136218* (2013.01)

(56) References Cited

U.S. PATENT DOCUMENTS

| | | | |
|---|---|---|---|
| 9,110,341 B2 | 8/2015 | Morita et al. | |
| 9,140,938 B2 | 9/2015 | Hasegawa et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2006/0268186 A1* | 11/2006 | Kamada | G02F 1/136213 349/38 |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2012/0293752 A1 | 11/2012 | Takeda et al. | |
| 2013/0057815 A1 | 3/2013 | Takano et al. | |
| 2013/0093983 A1 | 4/2013 | Kizu et al. | |

FOREIGN PATENT DOCUMENTS

| | | |
|---|---|---|
| JP | 7-159807 | 6/1995 |
| JP | 9-160041 | 6/1997 |
| JP | 9-160042 | 6/1997 |
| JP | 9-160061 | 6/1997 |
| JP | 9-230380 | 9/1997 |
| JP | 10-26765 | 1/1998 |
| JP | 10-90708 | 4/1998 |
| JP | 2000-81641 | 3/2000 |
| JP | 2005-3802 | 1/2005 |
| JP | 3644653 | 2/2005 |
| JP | 2005-242307 | 9/2005 |
| JP | 2009-109657 | 5/2009 |

* cited by examiner

LIQUID CRYSTAL DISPLAY DEVICE

CROSS-REFERENCE TO RELATED APPLICATION

This application is a divisional of U.S. application Ser. No. 13/763,888 filed Feb. 11, 2013, and is based upon and claims the benefit of priority from prior Japanese Patent Application No. 2012-075083 filed Mar. 28, 2012, the entire contents of each of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, structures using lateral electric field, such as IPS (In-Plane Switching) mode and FFS (Fringe Field Switching) mode, attract attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
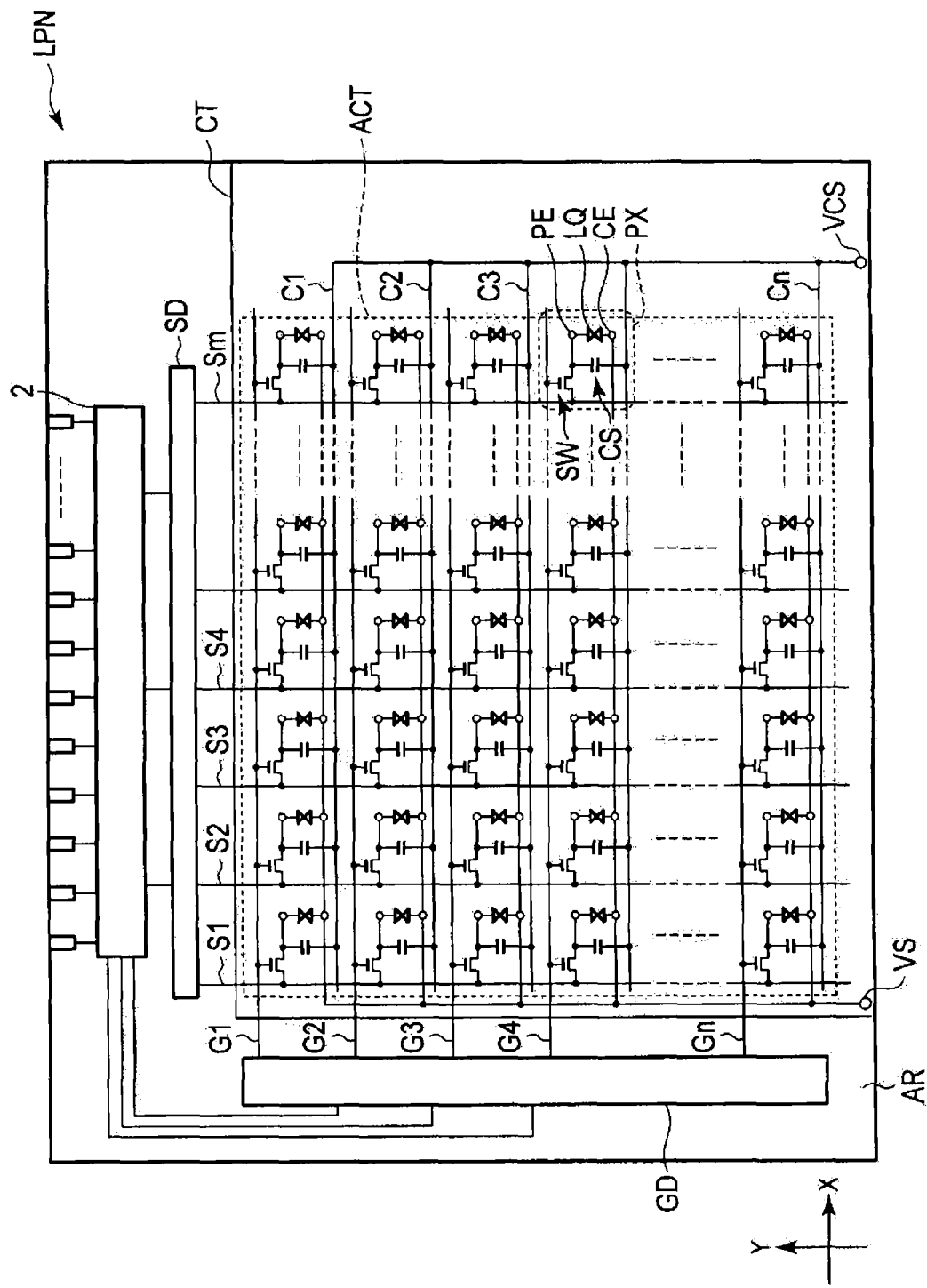
FIG. 1 is a figure schematically showing a structure and the equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a gate line and an auxiliary capacitance line respectively extending in a first direction, a source line extending in a second direction orthogonally crossing the first direction, a switching element electrically connected with the gate line and the source line, a pixel electrode including a main pixel electrode electrically connected with the switching element and extending in the second direction in the shape of a belt, a first alignment film covering the pixel electrode, and a second substrate including; a common electrode having a pair of main common electrodes arranged on both sides sandwiching the main pixel electrode and extending in the second direction, a second alignment film covering the common electrode, and a liquid crystal layer held between the first alignment film and the second alignment film and including liquid crystal molecules; wherein the liquid crystal layer is formed of materials having negative dielectric constant anisotropy, and the liquid crystal molecules are initially aligned substantially in parallel with the first direction when electric field is not impressed between the pixel electrode and the common electrode.

According to other embodiment, a liquid crystal display device constituted by a plurality of pixels arranged in a matrix includes: a first substrate including; a first gate line and a second gate line respectively extending in a first direction, an auxiliary capacitance line extending in the first direction at a substantially center portion between the first gate line and the second gate line, a first source line and a second source line extending in a second direction orthogonally crossing the first direction, a switching element electrically connected with the first gate line and the first source line, a pixel electrode including a main pixel electrode electrically connected with the switching element and extending in the second direction in the shape of a belt between the first source line and the second source line, and a sub-pixel electrode arranged on the auxiliary capacitance line and connected with the main pixel electrode, the sub-pixel electrode extending in the first direction between the first source line and the second source line, a first alignment film covering the pixel electrode, and a second substrate including; a common electrode having a pair of main common electrodes arranged on the first and second source lines on both sides sandwiching the main pixel electrode and extending in the second direction, a second alignment film covering the common electrode, and a liquid crystal layer held between the first alignment film and the second alignment film and including liquid crystal molecules; wherein the liquid crystal layer is formed of materials having negative dielectric constant anisotropy, and the liquid crystal molecules are initially aligned substantially in parallel with the first direction when electric field is not impressed between the pixel electrode and the common electrode.

FIG. 1 is a figure schematically showing a structure and the equivalent circuit of the liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C extend in a first direction X, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT, and connected to a gate driver GD. Each source line S is pulled out to the outside of the active area ACT and connected to a source driver SD. At least a portion of the gate driver GD and the source driver SD is formed in the array substrate AR, for example, and connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to the principle surfaces of the array substrate AR and the counter substrate CT.

The switching element SW is constituted by an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the plurality of pixel electrodes PE through the liquid crystal layer LQ. Though the pixel electrode PE and the common electrode CE are formed by light transmissive conductive materials, such as Indium Tin Oxide (ITO), Indium Zinc Oxide (IZO), etc., other metals such as aluminum may be used.

The array substrate AR includes an electric power supply portion VS formed outside of the active area ACT for impressing a voltage to the common electrode CE. Furthermore, the common electrode CE is drawn to outside of the active area ACT and electrically connected with an electric power supply portion VS formed in the array substrate AR through an electric conductive component which is not illustrated.

FIG. 2A is a plan view schematically showing the structure of one pixel when the liquid crystal display panel according to a first embodiment is seen from the counter substrate side. Herein, a plan view in a X-Y plane specified in the first direction X and the second direction Y is shown.

The gate line G1, the gate line G2, and the auxiliary capacitance line C1 extend along the first direction X, respectively. The source line S1 and source line S2 extend along the second direction Y, respectively. The auxiliary capacitance line C1 is located substantially in the middle between the gate line G1 and the gate line G2. That is, the distance between the gate line G1 and the auxiliary capacitance line C1 in the second direction Y is substantially the same as the distance between the gate line G2 and the auxiliary capacitance line C1 in the second direction Y.

In this embodiment, the pixel PX corresponds to a square formed of the gate line G1, the gate line G2, the source line S1, and the source line S2 and has a shape of a rectangle whose length in the second direction Y is longer than that in the first direction X, as shown by a dashed line in the figure. The length of the pixel PX in the first direction X corresponds to a pitch in the first direction X between the source line S1 and the source line S2, and the length in the second direction Y of the pixel PX corresponds to the pitch in the second direction Y between the gate line G1 and the gate line G2. The pixel electrode PE is arranged between adjoining the source line S1 and source line S2. Moreover, the pixel electrode PE is located between the gate line G1 and the gate line G2.

In this embodiment, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side. Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel which adjoins the illustrated pixel PX on its lower end side. The auxiliary capacitance line C1 is arranged approximately in a central portion of the pixel PX.

The switching element SW is electrically connected with the gate line G1 and the source line S1 in the illustrated example. Namely, the switching element SW is formed in an intersection of the gate line G1 with the source line S1. A drain line extends along the source line S1 and the auxiliary capacitance line C1, and is electrically connected with the pixel electrode PE through a contact hole CH formed in a region which overlaps with the auxiliary capacitance line C1. The switching element SW is formed in a region which overlaps with the source line S1 and the auxiliary capacitance line C1 and hardly runs off the overlapped region. Thereby, reduction of the area of an aperture portion which contributes to a display is suppressed when the switching element SW is formed in the pixel PX.

The pixel electrode PE is equipped with a main pixel electrode PA and a sub-pixel electrodes PB. The main pixel electrodes PA and the sub-pixel electrode PB are formed integrally or continuously, and electrically connected mutually. In addition, although only the pixel electrode PE arranged in one PX is illustrated in the figure, the pixel electrode of the same form is arranged in other pixels which are not illustrated.

The main pixel electrode PA extends along the second direction Y between the source line S1 and the source line S2, and is formed in the shape of a belt having a predetermined width along the first direction X. The main pixel electrode PA is located approximately in the center between the source line S1 and the source line S2. That is, the distance between the source line S1 and the main pixel electrode PA in the first direction X is substantially the same as the distance between the source line S2 and the main pixel electrode PA in the first direction X.

The sub-pixel electrode PB is formed in the shape of a belt extending along the first direction X between the source line S1 and the source line S2. In this embodiment, the sub-pixel electrode PB crosses the main pixel electrode PA in the intermediate portion thereof in the second direction Y. The sub-pixel electrode PB linearly extends toward the source line S1 and the source line S2, respectively, from the intersection portion of the main pixel electrode PA. That is, the pixel electrode PE shown here is formed in the shape of a cross.

Moreover, in this embodiment, the sub-pixel electrode PB is located above the auxiliary capacitance line C1. That is, the whole sub-pixel electrode PB is located in a region which overlaps with the auxiliary capacitance line C1. The sub-pixel electrode PB is electrically connected with the switching element SW through a contact hole CH.

The common electrode CE is equipped with a main common electrode CA. The main common electrode CA linearly extends along the second direction Y in parallel to the main pixel electrode PA on both sides which sandwich the main pixel electrode PA in the X-Y plane. The main common electrode CA is formed in the shape of a belt having the same width in the first direction X.

In this embodiment, the main common electrode CA is arranged in two lines in parallel along the first direction X. Hereinafter, in order to distinguish the two lines, the main common electrode CA on the left-hand side in the figure is called CAL, and the main common electrode on the right-hand side in the figure is called CAR. Precisely, the main common electrode CAL is arranged striding over a boundary between the illustrated pixel and a pixel which adjoins the illustrated pixel PX on the left-hand side. The main common electrode CAR is arranged at the right-hand side end. Precisely, the main common electrode CAR is arranged striding over a boundary between the illustrated pixel and a pixel which adjoins the illustrated pixel PX on the right-hand side. The main common electrode CAL counters with the source line S1, and the main common electrode CAR counters with the source line S2. The main common electrode CAL and the main common electrode CAR are electrically connected in the active area or outside of the active area.

If its attention is paid to the positional relationship between the pixel electrode PE and the common electrode CE in the X-Y plane, the main pixel electrode PA and the main common electrode CA are arranged by turns along the first direction X. That is, one main pixel electrode PA is arranged between the adjoining main common electrode CAL and main common electrode CAR. The main pixel electrode PA is located substantially in the center between main common electrode CAL and main common electrode CAR. Namely, the distances between the main common electrode CAL and the main pixel electrode PA, and between the main common electrode CAR and the main pixel electrode PA are substantially the same in the first direction X.

Figure 2:
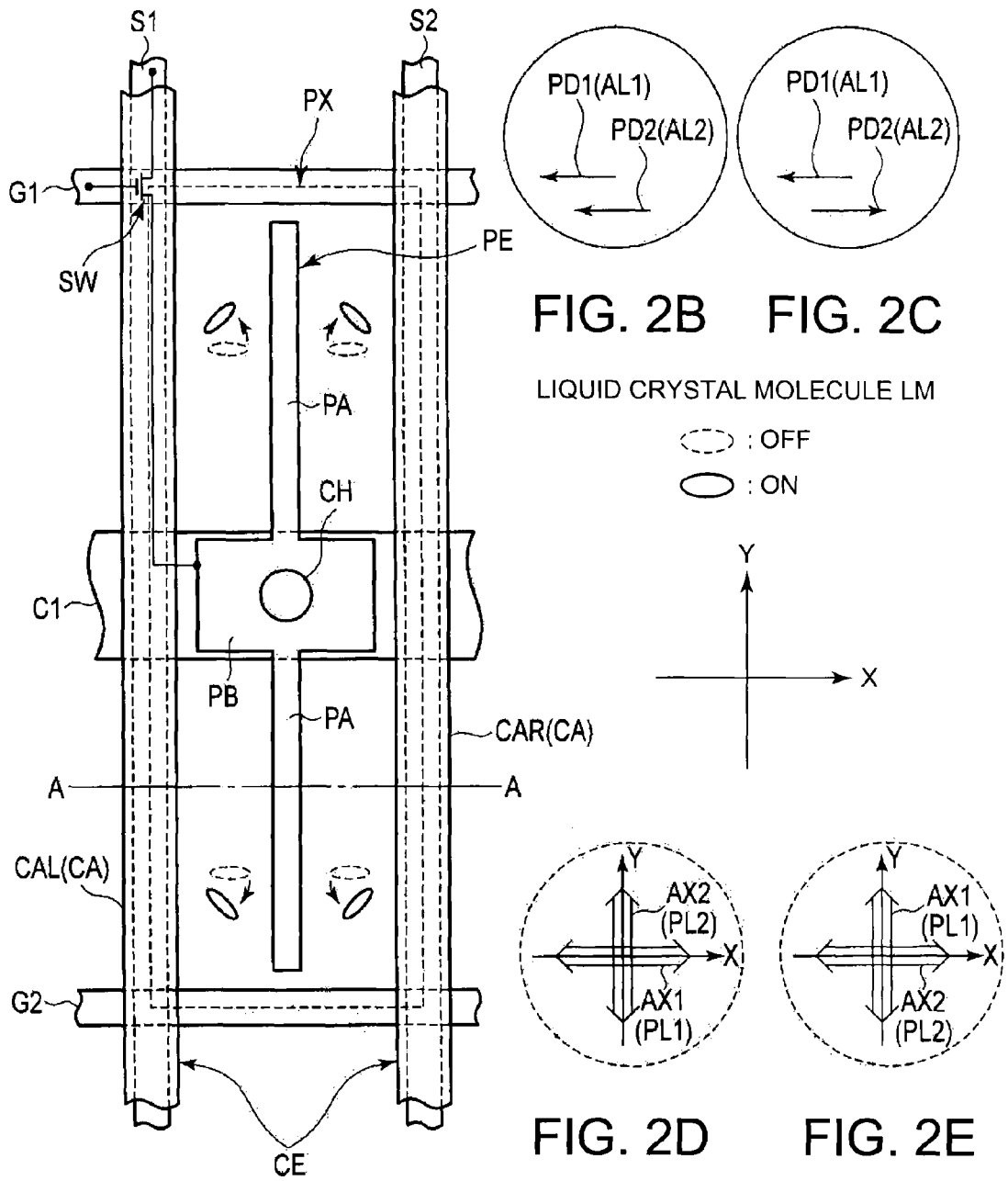
FIG. 2A is a plan view schematically showing a structure of one pixel when a display panel shown in FIG. 1 is seen from a counter substrate side according to a first embodiment.
FIGS. 2B and 2C are views showing alignment treatment directions.
FIGS. 2D and 2E are views showing polarizing axis directions of polarization plates.
Figure 3:
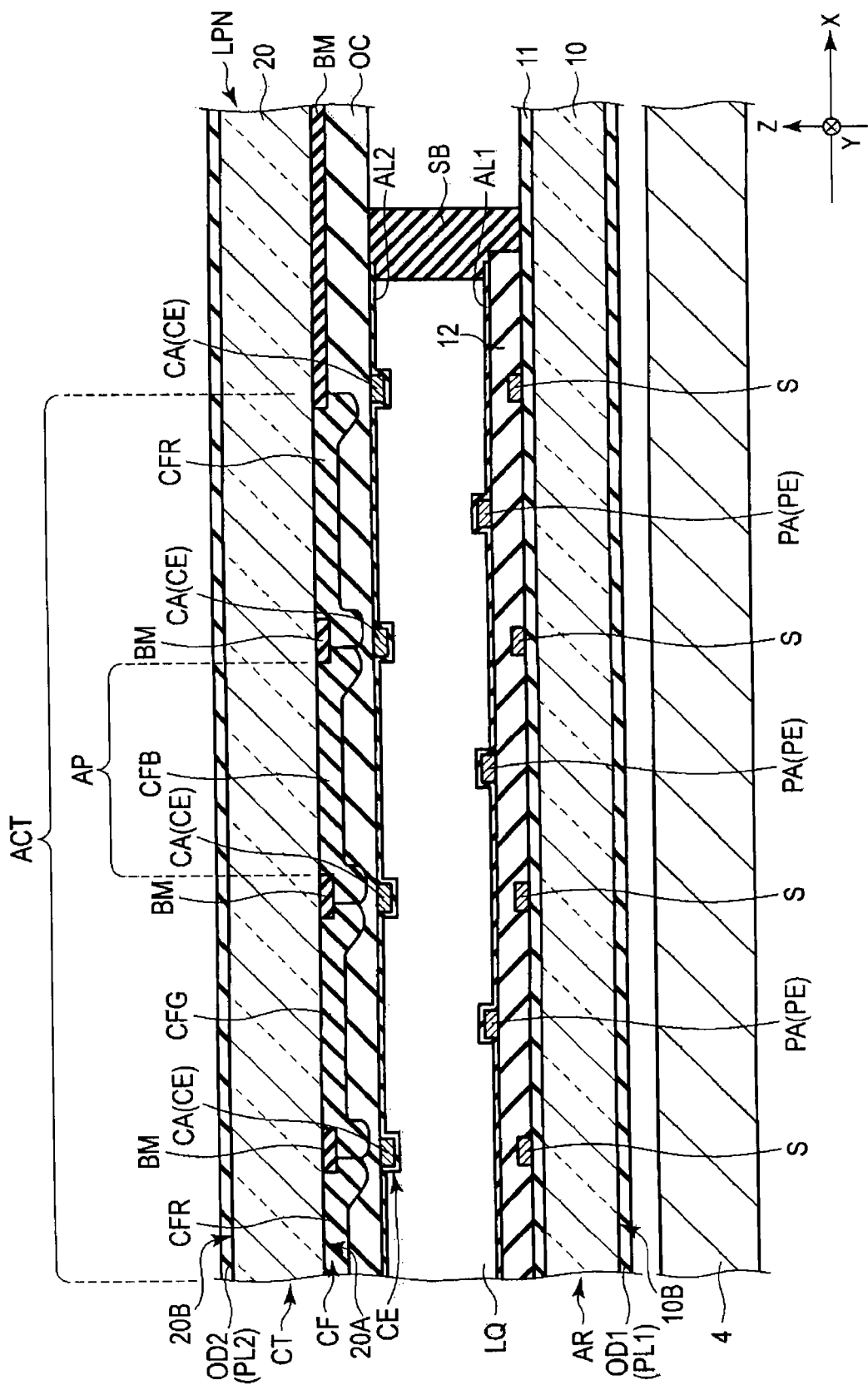
FIG. 3 is a cross-sectional view schematically showing the structure of the liquid crystal display panel taken along line A-A shown in FIG. 2A.

FIG. 3 is a cross-sectional view schematically showing the structure of the liquid crystal display panel taken along line A-A shown in FIG. 2A. In addition, only the portion required for explanation is illustrated here.

A backlight 4 is arranged on the back side of the array substrate AR in the illustrated example. Various types of backlights can be used. For example, a light emitting diode (LED) and a cold cathode fluorescent lamp (CCFL), etc., can be applied as a light source of the backlight 4, and the explanation about its detailed structure is omitted.

The array substrate AR is formed using a first insulating substrate 10 which has a transmissive characteristics. The source line S is formed on a first interlayer insulating film 11 and covered with a second interlayer insulating film 12. In addition, the gate line and the auxiliary capacitance line which are not illustrated are arranged between the first insulating substrate 10 and the first interlayer insulating film 11, for example. The pixel electrode PE is formed on the second interlayer insulating film 12. The pixel electrode PE is located inside of the pixel rather than the position on the respective adjoining source lines S. A first alignment film AL1 is arranged on the array substrate AR facing the counter substrate CT, and extends to whole active area ACT. The first alignment film AL1 covers the pixel electrode PE, etc., and is also arranged on the second insulating layer 12. The first alignment film AL1 is formed of the material which shows a horizontal alignment characteristics.

The counter substrate CT is formed using a second insulating substrate 20 which has a transmissive characteristics. The counter substrate CT includes a black matrix BM, a color filter CF, an overcoat layer OC, the common electrode CE, and a second alignment film AL2, etc.

The black matrix BM is formed on the second insulating substrate 20 defining each pixel PX, and forms an aperture portion AP facing the pixel electrode PE. That is, the black matrix BM is arranged so that line portions, such as the source line S, the gate line G, the auxiliary capacitance line C1, and the switching element SW, may counter the black matrix BM. Herein, though only a portion of the black matrix BM extending along the second direction Y is shown, the black matrix BM may include a portion extending along the first direction X. The black matrix BM is formed on an internal surface 20A of the second insulating substrate 20 facing the array substrate AR.

The color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in the adjoining pixels PX differ mutually in the first direction X. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM. The overcoat layer OC covers the color filter CF. The overcoat layer OC eases influence of concave-convex of the surface of the color filter CF. The overcoat layer OC is formed of transparent material.

The common electrode CE is formed on the overcoat layer OC facing the array substrate AR. The main common electrode CA is located above the source line S. The second alignment film AL2 is arranged on the counter substrate CT facing the array substrate AR, and extends to whole active area ACT. The second alignment film AL2 covers the common electrode CE, the overcoat layer OC, etc. The second alignment film AL2 is formed of materials which show horizontal alignment characteristics.

An alignment treatment (for example, rubbing processing or light alignment processing) is performed to the first alignment film AL1 and the second alignment film AL2 to initially align the molecules of the liquid crystal layer LQ. A first alignment treatment direction PD1 in which the first alignment film AL1 initially aligns the molecules is in parallel with a second alignment treatment direction PD2 in which the second alignment film AL2 initially aligns the molecules. For example, in FIG. 2B, the first alignment treatment direction PD1 and the second alignment treatment direction PD2 are in parallel with the first direction X and are the same directions each other. In FIG. 2C, the first alignment treatment direction PD1 and the second alignment treatment direction PD2 are in parallel with the first direction X and are the opposite directions each other.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed. The array substrate AR and the counter substrate CT are pasted together by seal material SB arranged outside the active area ACT, while the predetermined cell gap is formed.

The liquid crystal layer LQ is held at the cell gap formed between the array substrate AR and the counter substrate CT and arranged between the first alignment film AL1 and the second alignment film AL2. The liquid crystal layer LQ contains the liquid crystal molecule which is not illustrated. The liquid crystal layer LQ is constituted by liquid crystal materials having negative dielectric anisotropy (negative type).

A first optical element OD1 is attached on an external surface 10B of the array substrate AR, i.e., the external surface of the first insulating substrate 10 which constitutes the array substrate AR, by adhesives, etc. The first optical element OD1 is located on a side which counters with the backlight 4 of the liquid crystal display panel LPN, and controls the polarization state of the incident light which enters into the liquid crystal display panel LPN from the backlight 4. The first optical element OD1 includes a first polarization plate PL1 having a first polarizing axis (or first absorption axis) AX1. In addition, other optical elements such as the retardation film may be arranged between the first polarization plate PL1 and the first insulating substrate 10.

A second optical element OD2 is attached on an external surface 20B of the counter substrate CT, i.e., the external surface of the second insulating substrate 20 which constitutes the counter substrate CT, by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis (or second absorption axis) AX2. In addition, other optical elements such as a retardation film may be arranged between the second polarization plate PL2 and the second insulating substrate 20.

The first polarizing axis AX1 of the first polarizing plate PL1 and the second polarizing axis AX2 of the second polarization plate PL2 are arranged in the positional relationship of Cross Nicol. In this state, one polarization plate is arranged so that the polarizing axis becomes in parallel with or orthogonally crosses the initial alignment direction of the liquid crystal molecules. In FIG. 2D, the first polarization plate PL1 is arranged so that the first polarizing axis AX1 becomes in parallel with the first direction X, and the second polarization plate PL2 is arranged so that the second polarizing axis AX2 orthogonally crosses the first direction X. In FIG. 2E, the first polarization plate PL1 is arranged so that the first polarizing axis AX1 orthogonally crosses the first direction X, and the second polarization plate PL1 is arranged so that the second polarizing axis AX2 becomes in parallel with the first direction X.

The operation of the liquid crystal display panel LPN of the above-mentioned structure is explained referring to FIGS. 2A, 2B, 2C, 2D, 2E and 3.

At the time of non-electric field state, i.e., when a potential difference (i.e., electric field) is not formed between the pixel electrode PE and the common electrode CE, the liquid crystal molecules LM of the liquid crystal layer LQ are aligned so that their long axes are aligned in a parallel direction with the first alignment direction PD1 of the first alignment film AL1 and the second alignment direction PD2 of the second alignment film AL2. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with a X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with the X-Y plane, and is explained as what rotates in a field in parallel with the X-Y plane.

Here, both of the first alignment treatment direction PD1 of the first alignment film AL1 and the second alignment treatment direction PD2 of the second alignment film AL2 are directions in parallel to the first direction X. At the time of OFF, the long axis of the liquid crystal molecule LM is aligned substantially in parallel to the first direction X as shown with the dashed line in FIG. 2A. That is, the direction of the initial alignment of the liquid crystal molecule LM is in parallel to the first direction X, or makes an angle of 0° with respect to the first direction X.

When the respective first alignment treatment direction PD1 and second alignment treatment direction PD2 are in parallel and the same directions each other, the liquid crystal molecule LM is aligned with approximately horizontal direction (i.e., the pre tilt angle is approximately zero) in a cross-section of the liquid crystal layer LQ in the intermediate portion of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment). Thus, in the splay alignment state, the display is optically compensated even in an inclining direction from the normal line of the substrate by the liquid crystal molecules LM near the first alignment film AL1 and the second alignment film AL2. Therefore, when the respective first alignment treatment direction PD1 and second alignment treatment direction PD2 are in parallel and the same directions each other, there are few optical leaks in a black display. Accordingly, a high contrast ratio can be realized, and it becomes possible to improve display grace.

In addition, when both of the first and second alignment treatment directions PD1 and PD2 are in parallel, and are opposite directions each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment).

A portion of the light from the backlight 4 penetrates the first polarizing plate PL1, and enters into the liquid crystal display panel LPN. The entered light to the liquid crystal display panel LPN is linearly polarized light orthogonally crossing the first polarizing axis AX1 of the first polarization plate PL1. The linearly polarized state of the entered light does not change with the alignment state of the liquid crystal molecule LM when the light passes the liquid crystal layer LQ at the time OFF. Therefore, the lineally polarized light which penetrates the liquid crystal display panel LPN is absorbed by the second polarization plate PL2 arranged in a Cross Nicol state (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the long axis rotates in parallel with the X-Y plane as shown in a solid line in the figure. According to this embodiment, the liquid crystal layer LQ has a negative dielectric constant anisotropy, and aligns in a direction so that the long axis crosses the electric field.

In the embodiment shown in FIG. 2A, in a region between the pixel electrode PE and the main common electrode CAL, the liquid crystal molecule LM in the lower half region rotates clockwise to the first direction X, and aligns so that it may turn to the lower right in the figure. The liquid crystal molecule LM in the upper half region rotates counterclockwise to the first direction X, and aligns so that it may turn to the upper right in the figure. On the other hand, in the region between the main pixel electrode PA and the main common electrode CAR, the liquid crystal molecule LM in the lower half region rotates counterclockwise to the first direction X, and aligns so that it may turn to the lower left in the figure. The liquid crystal molecule LM in the upper half region rotates clockwise to the first direction X, and aligns so that it may turn to the upper left in the figure.

Thus, in each pixel PX, in case electric field is formed between the pixel electrode PE and the common electrode CE, the alignment direction of the liquid crystal molecule LM is divided into a plurality of directions by the position which overlaps with the pixel electrode PE and the common electrode CE, and domains are formed in each alignment direction. That is, a plurality of domains is formed in one pixel PX.

At the time of ON, the linearly polarized light orthogonally crossing the first polarizing axis AX1 of the first polarization plate PL1 enters in the liquid crystal panel LPN, and the polarization state of the light changes in accordance with the alignment state of the liquid crystal molecule LM when passing the liquid crystal layer LQ. At the time of ON, at least a portion of the light which passes the liquid crystal layer LQ penetrates the second polarization plate PL2 (white display).

Figure 4A:
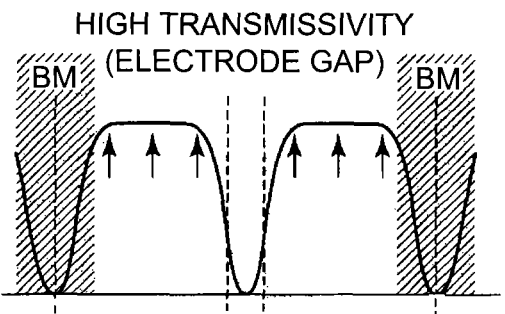
FIGS. 4A, 4B and 4C are views showing electric field between a pixel electrode and a common electrode, and a relationship between a director and a transmissivity of liquid crystal molecules by the electric field in the liquid crystal display panel shown in FIG. 2A.
Figure 4B:
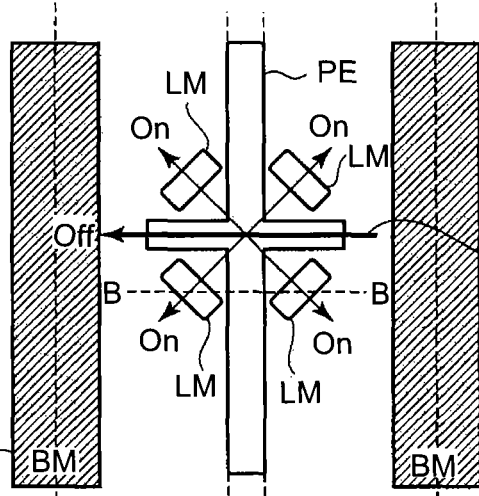
Figure 4C:
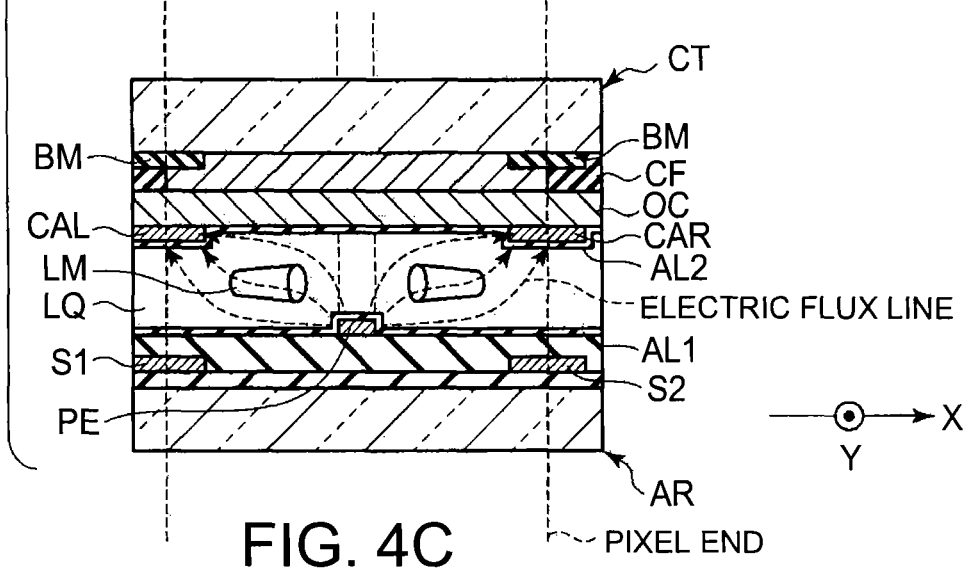

FIGS. 4A, 4B and 4C are views showing electric field between the pixel electrode PE and the common electrode CE, and a relationship between a director and a transmissivity of the liquid crystal molecule LM by the electric field in the liquid crystal display panel LPN shown in FIG. 2A. FIG. 4A is a view schematically showing a transmissivity distribution in one pixel PX. FIG. 4B is a plan view of one pixel schematically showing an alignment state of the liquid crystal molecules. FIG. 4C is a cross-sectional view showing the pixel taken along line B-B in FIG. 4B.

In the OFF state, the liquid crystal molecule LM is aligned in a direction in parallel to the first direction X. In the ON state in which potential difference is formed between the pixel electrode PE and the common electrode CE, in case the director (or the direction of the long axis) of the liquid crystal molecule LM shifts by approximately 45° with respect to the first polarizing axis (or absorption axis) AX1 of the first polarization plate PL1 and the second polarizing axis (or absorption axis) AX2 of the second polarization plate PL2, an optical modulation rate of the liquid crystal molecules becomes the highest. That is, the transmissivity becomes the highest in the aperture portion.

In the illustrated example, peak transmissivity is obtained in the pixel in the ON state when the director of the liquid crystal molecule LM in the upper half region between the main common electrode CAL and the pixel electrode PE becomes a direction substantially in parallel to a direction of 45° to 225°, and the director of the liquid crystal molecule LM in a lower half region between the main common electrode CAL and the pixel electrode PE becomes a direction substantially in parallel to a direction of 135° to 315°, further when the director of the liquid crystal molecule LM in a lower half region between the main common electrode CAR and the pixel electrode PE becomes a direction substantially in parallel to a direction of 45° to 225°, and the director of the liquid crystal molecule LM in an upper half region between the main common electrode CAR and the pixel electrode PE becomes a direction substantially in parallel to a direction of 135° to 315°, within the X-Y plane by the electric field between the pixel electrode PE and the common electrode CE. In addition, the transmissivity in the aperture portion becomes smallest when the director of the liquid crystal molecule LM becomes substantially in parallel with a direction of 0° to 180° or a direction of 90° to 270° in the X-Y plane.

That is, when the rotation angle is 45° within the X-Y plane of the liquid crystal molecule LM, the largest transmissivity is obtained, and even if it is when the rotation angle is smaller than 45° or larger than 45°, the transmissivity falls. The rotational angle depends on the strength of the electric field. Therefore, when a driving voltage (white voltage) by which the rotation angle of the liquid crystal molecule LM becomes 45° is impressed, the maximum luminosity is obtained in the pixel PX. When larger or smaller driving voltage than the white voltage is impressed, the luminosity of the pixel PX is less than the maximum luminosity.

In the ON state, if its attention is paid to a transmissivity distribution in each pixel, the liquid crystal molecule LM hardly rotates from the initial alignment direction on the pixel electrode PE and the common electrode CE. That is, the director of the liquid crystal molecule LM becomes substantially in parallel with the direction of 0° to 180°. For this reason, while the transmissivity becomes the minimum (substantially zero) on the electrodes, high transmissivity is obtained in the electrode gap between the pixel electrode PE and the common electrode CE over the whole gap.

Furthermore, even at the time of ON, since the lateral electric field is hardly formed (or sufficient electric field to drive the liquid crystal molecule LM is not formed) on the pixel electrode PE or the common electrode CE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, the backlight hardly penetrates, and hardly contributes to the display at the time of ON. Therefore, the pixel electrode PE and the common electrode CE are not necessarily needed to be formed of a transparent electric conductive material, and may be formed using non-transparent electric conductive materials, such as aluminum (Al), silver (Ag), and copper (Cu).

Moreover, since high transmissivity is obtained in the electrode gap between the pixel electrode PE and the common electrode CE according to this embodiment, it becomes possible to correspond by expanding the inter-electrode distance between the pixel electrode PE and the main common electrodes CAL and CAR in order to make transmissivity of each pixel high enough. Moreover, in the product specifications in which the pixel pitch differs each other, it becomes possible to use the peak condition of the transmissivity distribution as shown in FIG. 4A by changing the inter-electrode distance, i.e., by changing the location of the main common electrode with respect to the main pixel electrode arranged substantially in the center of the pixel PX. That is, in the display mode according to this embodiment, it becomes possible to supply the display device having various pixel pitches by setting up inter-electrode distance between the main pixel electrode and main common electrode corresponding to the product specification from low resolution with a comparatively large pixel pitch to high resolution with a comparatively small pixel pitch without necessarily using microscopic processing. Therefore, it becomes possible to realize the demand for high transmissivity and high resolution easily.

Moreover, as shown in FIGS. 4A and 4B, if its attention is paid to the transmissivity distribution in the region which overlaps with the black matrix BM, the transmissivity fully falls. This is because the leak of electric field does not occur outside of the pixel from the common electrode CE, and undesired lateral electric field is not produced between the adjoining pixels on the both sides of the black matrix BM. That is, it is because the liquid crystal molecule of the region which overlaps with the black matrix BM maintains the state of the initial alignment like at the OFF time (or the time of the black display). Therefore, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference in distances may arises between the respective common electrodes CE of the both sides and the pixel electrode PE along the first direction X. However, since the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is a case where the color of the color filter differs between the adjoining pixels, it becomes possible to control generating of mixed colors, and also becomes possible to realize more genuine color reproducibility nature.

In this embodiment, the main common electrode CAR and the main common electrode CAL counter with the source lines S, respectively. In the case the main common electrode CAL and the main common electrode CAR are arranged above the source line S1 and the source line S2, respectively, the aperture portion AP which contributes to the display can be expanded as compared with the case where the main common electrode CAL and the main common electrode CAR are arranged on the main pixel electrode PA side rather than above the source line S1 and the source line S2, and it becomes possible to improve the transmissivity of the pixel PX.

Moreover, it becomes possible to expand the distances between the pixel electrode PE and the second main common electrode CAL, and between the pixel electrode PE and the second main common electrode CAR by arranging each of the main common electrodes CAL and the main common electrode CAR above the source line S1 and the source line S2, respectively, and also becomes possible to form more horizontal electric field closer to the horizontal direction. For this reason, it becomes possible also to maintain the wide viewing angle which is advantages of the general IPS mode.

Moreover, according to this embodiment, it becomes possible to form a plurality of domains in each pixel. For this reason, a viewing angle can be optically compensated in a plurality of directions, and wide viewing angle is attained.

Moreover, since the dielectric constant anisotropy of the liquid crystal layer LQ is negative according to this embodiment, at the time of ON, the liquid crystal layer LQ rotates in the X-Y plane so that the long axis aligns in a direction which perpendicularly intersects with the electric field. Although the main electric field for driving the liquid crystal molecule LM is an oblique electric field formed between the pixel electrode PE on the array substrate AR and the common electrode CE on the counter substrate CT, in the liquid crystal layer LQ at the time of ON, the liquid crystal molecule LM aligns so that the long axis may orthogonally cross the electric field. Therefore, the liquid crystal molecule LM aligns in parallel to the principal surface of the substrates between the array substrate AR and the counter substrate CT.

Figure 5:
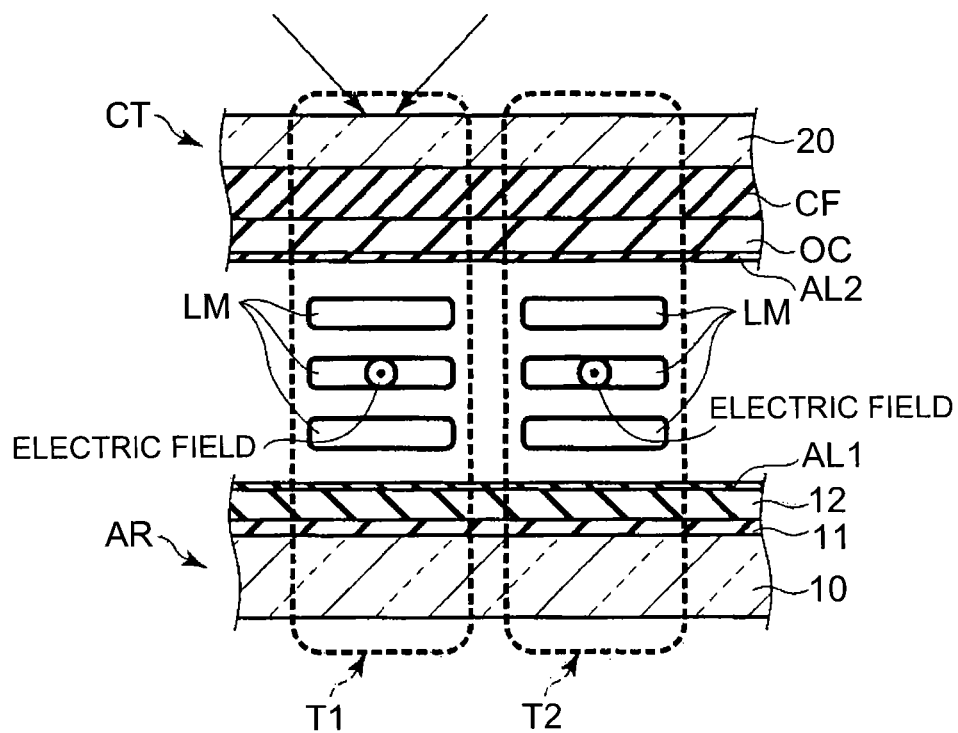
FIG. 5 is a view schematically showing an alignment state of liquid crystal molecules in a liquid crystal layer at the time ON according to the embodiment.

FIG. 5 is a view schematically showing the alignment state of liquid crystal molecules in the liquid crystal layer at the time ON according to the embodiment.

The long axis of the liquid crystal molecule LM at the time of ON orthogonally crosses the electric field in the normal line direction of the figure. The liquid crystal molecule LM located near the first alignment film AL1, the second alignment film AL2, and in the intermediate portion of the liquid crystal molecule LQ are respectively arranged in parallel to the substrate surface.

For this reason, in a first transmissive region T1 shown with the dashed line in the figure, even if the first transmissive region T1 is observed from any directions, uniform display grace is obtained. Moreover, substantially the same display grace can be obtained also in both of the first transmissive region T1 and a second transmissive region T2. That is, if there were a difference in area between the first transmissive region T1 and the second transmissive region T2, it is possible to obtain uniform display grace even if the pixel is observed from any directions.

Figure 6:
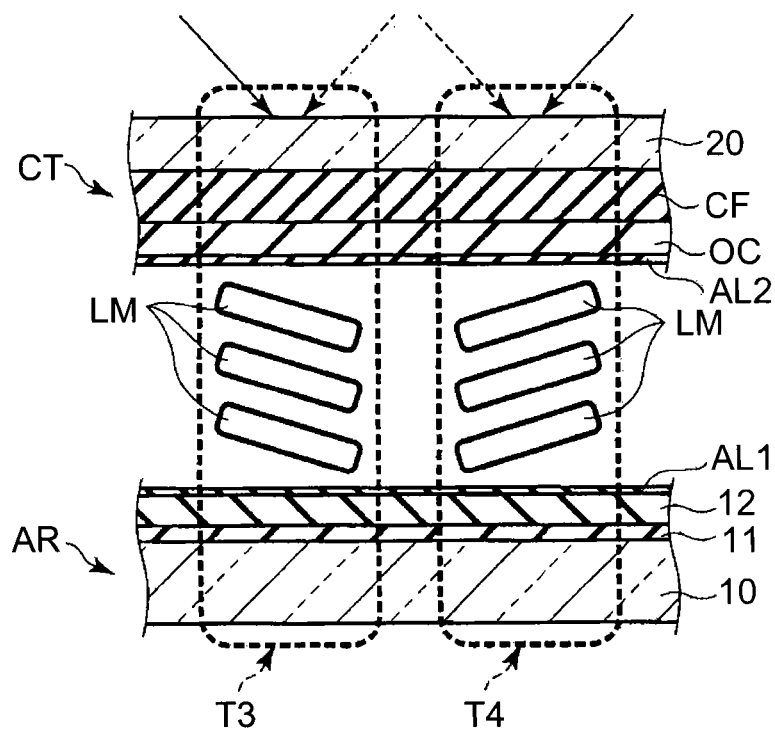
FIG. 6 is a view schematically showing the alignment state of liquid crystal molecules in a liquid crystal layer at the time ON according to a comparison example.

FIG. 6 is a view schematically showing the alignment state of liquid crystal molecules in the liquid crystal layer at the time ON according to a comparison example.

In the illustrated comparative example, the liquid crystal layer LQ having positive dielectric constant anisotropy is used. The liquid crystal molecule LM at the time of ON is aligned so that the long axis becomes in a parallel with the oblique electric field formed between the pixel electrode PE and the common electrode CE. That is, in the liquid crystal layer LQ at the time of ON, the liquid crystal molecule LM is in a tilted state to the substrate principal surface.

For this reason, in a third transmissive region T3 shown with the dashed line in the figure, a difference in the display grace arises between the case where the pixel PX is seen from the left-hand side, and the case where the pixel PX is seen from the right-hand side in the figure. Similarly, also in a fourth transmissive region T4, a difference in the display grace arises depending on an observation direction. Also in the case of the illustrated example, the third transmissive region T3 and the fourth transmissive region T4 optically compensate each other, and achieve the viewing angle characteristic equivalent to the example shown in FIG. 5. For this reason, when there is a difference in an area between the third transmissive region T3 and the fourth transmissive region T4 within one pixel PX, the optical compensation becomes imperfect. Accordingly, it is difficult to acquire a uniform viewing angle characteristic.

The difference in the areas of the transmissive regions may be resulted by an assembling shift between the array substrate AR and the counter substrate CT. In the case of the comparative example shown in FIG. 6, if the difference in the areas of the transmissive regions arises in one pixel, it may result in a bad influence to the display grace, especially the viewing angle characteristic. On the other hand, in this embodiment shown in FIG. 5, even if the difference in the areas of the transmissive regions arises in one pixel, it becomes possible to reduce the bad influence to the display grace.

It is also possible to provide a region for compensating the assembling shift in one pixel taking advantage of this embodiment. The constructional example is explained below.

Figure 7:
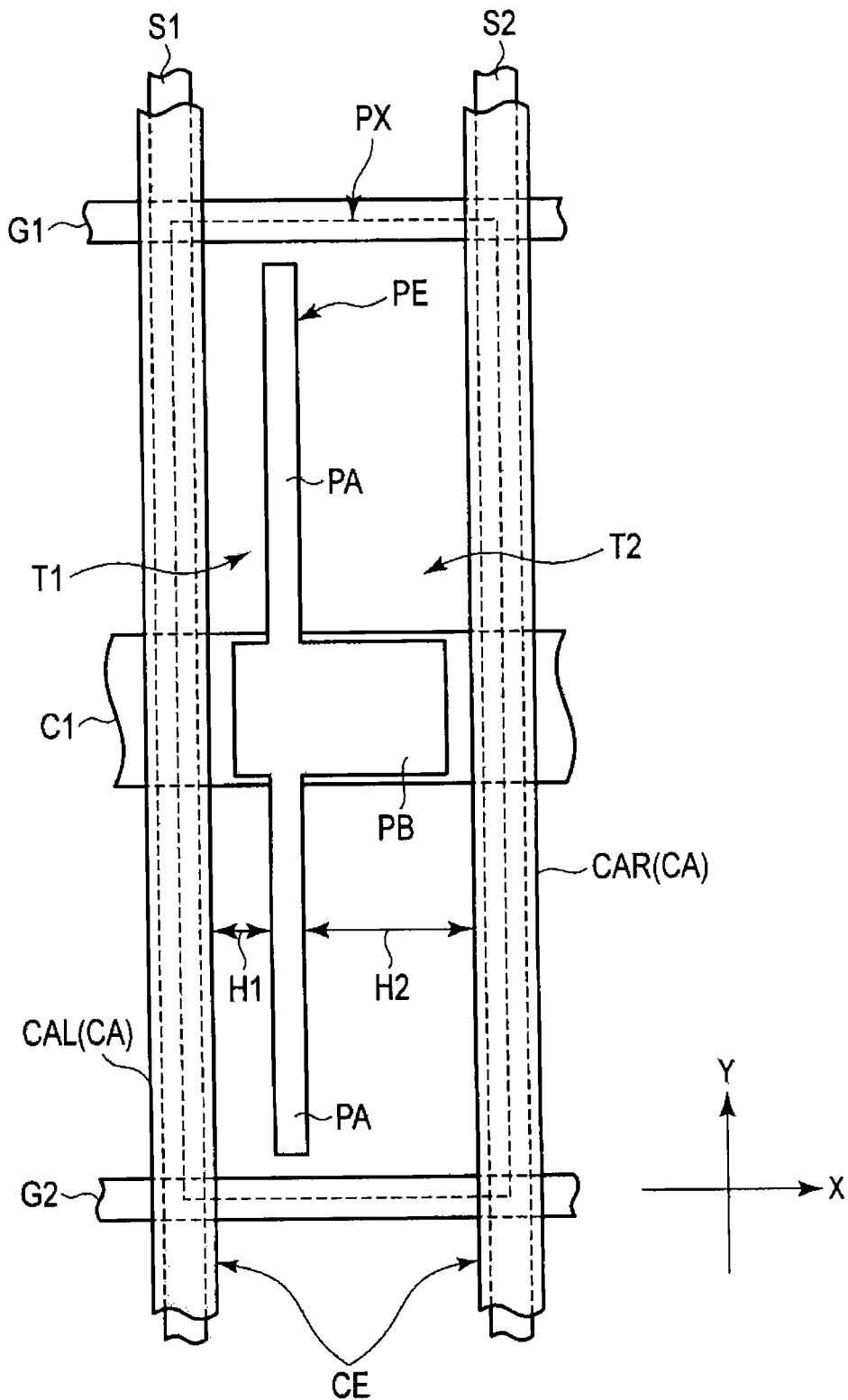
FIG. 7 is a plan view schematically showing a structure of one pixel when the display panel shown in FIG. 1 is seen from the counter substrate side according to a second embodiment.

FIG. 7 is a plan view schematically showing a structure of one pixel when the display panel shown in FIG. 1 is seen from the counter substrate side according to a second embodiment. In addition, only the portion required for explanation is illustrated here.

In this embodiment, comparing with the first embodiment shown in FIG. 2, the distance H1 between the main pixel electrode PA and the source line S1 (or main common electrode CAL) in the first direction X is smaller than the distance H2 between the main pixel electrode PA and the source line S2 (or main common electrode CAR) in the first direction X. That is, the main pixel electrode PA is arranged between the source line S1 and the source line S2 so that the main pixel electrode PA is arranged closer to the source line S1 side rather than the source line S2 side. Therefore, the area of the first transmissive region T1 formed between the main pixel electrode PA and the main common electrode CAL is smaller than the area of the second transmissive region T2 formed between the main pixel electrode PA and the main common electrode CAR.

In this embodiment, a region which mainly contributes to display is set to the second transmissive region T2 having larger area, and a region for compensating the assembling shift is set to the first transmissive region T1 having smaller area. That is, the distance H2 between the main pixel electrode PA and the main common electrode CAR is set as an optimum inter-electrode distance, and a white voltage corresponding to the distance H2 is set up. Therefore, when the white voltage is impressed between the pixel electrode PE and the common electrode CE, an optimum voltage is impressed to the liquid crystal layer LQ of the second transmissive region T2, and the rotation angle of the liquid crystal molecule LM within the X-Y plane becomes about 45°. Consequently, the highest transmissivity is obtained. On the other hand, too large voltage is impressed to the liquid crystal layer LQ of the first transmissive region T1, and the rotation angle of the liquid crystal molecule LM becomes larger than 45°. That is, the transmissivity of the first transmissive region T1 becomes lower than that of the second transmissive region T2. However, since the rate of the area of the first transmissive region T1 in one pixel is small, the influence of the transmissivity fall is also small in the first transmissive region T1.

Here, the case where the position of the common electrode CE shifts to the right-hand side in the figure arises with respect to the position of the pixel electrode PE by the assembling shift is reviewed. In this case, as compared with the case where the assembling shift does not arise, the distance H1 reduces more, and the distance H2 expands more. That is, although the area of the first transmissive region T1 becomes smaller than the case where the assembling shift does not arise, and the second transmissive region T2 becomes larger than the case where the assembling shift does not arise.

When the white voltage is impressed between the pixel electrode PE and the common electrode CE, since the voltage impressed to the liquid crystal layer LQ of the second transmissive region T2 becomes insufficient voltage level than the optimum voltage and the rotation angle of the liquid crystal molecule LM becomes smaller than 45°, the transmissivity becomes lower than the maximum transmissivity. However, since the area of the second transmissive region T2 is expanded, substantially the same luminosity is obtained as the case where the assembling shift does not arise when being seen in one pixel unit. In addition, although the transmissivity of the first transmissive region T1 has tendency to fall further than the case where the assembling shift does not arise, since the rate of the area of the first transmissive region T1 in one pixel becomes much smaller, the influence of the transmissivity fall in the first transmissive region T1 is small.

Next, the case where the position of the common electrode CE shifts to the left-hand side in the figure with respect to the main pixel electrode PE is reviewed. In this case, as compared with the case where the assembling shift does not arise, the distance H1 expands more, and the distance H2 reduces more. That is, the area of the first transmissive region T1 becomes larger, and the area of the second transmissive region T2 becomes smaller than the case where the assembling shift does not arise.

When the white voltage is impressed between the pixel electrode PE and the common electrode CE, the voltage impressed to the liquid crystal layer LQ of the second transmissive region T2 becomes too large rather than optimum voltage and the rotation angle of the liquid crystal molecule LM becomes smaller than 45°. Accordingly, the transmissivity becomes lower than the maximum transmissivity. On the other hand, since the voltage impressed to the liquid crystal layer LQ of the first transmissive region T1 closes to the optimum voltage comparing with the case where the assembling shift does not arise, the rotation angle of the liquid crystal molecule LM of the first transmissive region T1 closes to 45°. Accordingly, the transmissivity of the first transmissive region T1 rises than the case where the assembling shift does not arise. Therefore, substantially the same luminosity is obtained as the case where the assembling shift does not arise when being seen in one pixel.

Thus, according to this embodiment, it becomes possible to control the reduction of luminosity due to the assembling shift.

It is desirable that the dielectric constant anisotropy of the liquid crystal layer LQ applied to this embodiment is −10 or less. In addition, the dielectric constant anisotropy Δ∈ of the liquid crystal layer LQ is defined as follows.

Δ∈=(dielectric constant in the direction of the liquid crystal molecule long axis)−(dielectric constant in the direction of the liquid crystal molecule short axis)

The dielectric constant anisotropy can be considered as sensitivity to the electric field impressed to the liquid crystal layer LQ. Larger the absolute value of the dielectric constant anisotropy becomes, with smaller electric field, the liquid crystal molecule LM can be driven. When the material having the dielectric constant anisotropy of −10 or less is applied, it becomes possible to drive the liquid crystal molecule LM by the low voltage, even if the inter-electrode distance between the main pixel electrode PA and the main common electrode CA is expanded.

Hereinafter, other embodiments are explained.

Figure 8:
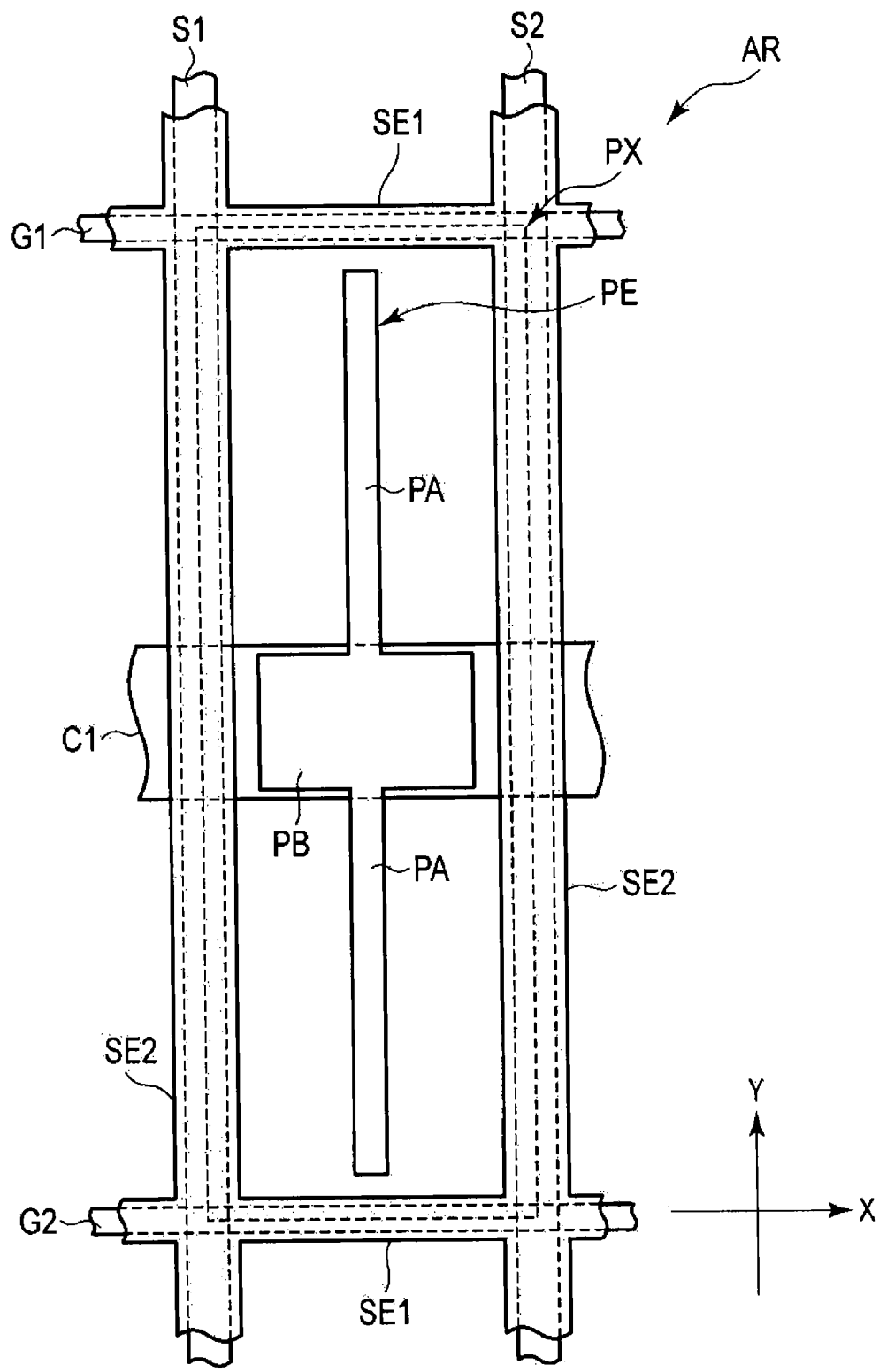
FIG. 8 is a plan view schematically showing a structure of an array substrate according to a third embodiment.

FIG. 8 is a plan view schematically showing a structure of the array substrate according to a third embodiment. The array substrate AR may be further equipped with a first shield electrode SE1. The first shield electrode SE1 is set to the same potential as that of the common electrode CE and extends along the first direction X. The first shield electrode SE1 is formed so that it may counter with each of the gate lines G extending in the first direction X. The first shield electrode SE1 is covered with the first alignment film AL1. By providing the first shield electrode SE1, it is possible to shield undesirable electric field from the gate line G. For this reason, it becomes possible to control degradation of the display grace.

In addition, the array substrate AR may be further equipped with a second shield electrode SE2. The second shield electrode SE2 is set to the same potential as that of the common electrode CE and extends along the second direction Y. The second shield electrode SE2 is formed so that it may counter with each of the source lines S. The second shield electrode SE2 is covered with the first alignment film AL1. By providing the second shield electrode SE2, it is possible to shield undesirable electric field from the source line S. Therefore, it becomes possible to control degradation of the display grace. The second shield electrode SE2 is combinable with the first shield electrode SE1. In this case, the first shield electrode SE1 is formed integrally or continuously with the second shield electrode SE2, and the first shield electrode SE1 and the second shield electrode SE2 form a lattice shape. When applying the array substrate AR equipped with the first shield electrode SE1 and the second shield electrode SE2, the pixel electrode PE is arranged on the inner side surrounded with the first shield electrode SE1 and the second shield electrode SE2. In addition, in this embodiment, the structure shown in FIG. 7 in which the areas of the first transmissive region T1 and the second transmissive region T2 are different each other may be used.

Figure 9:
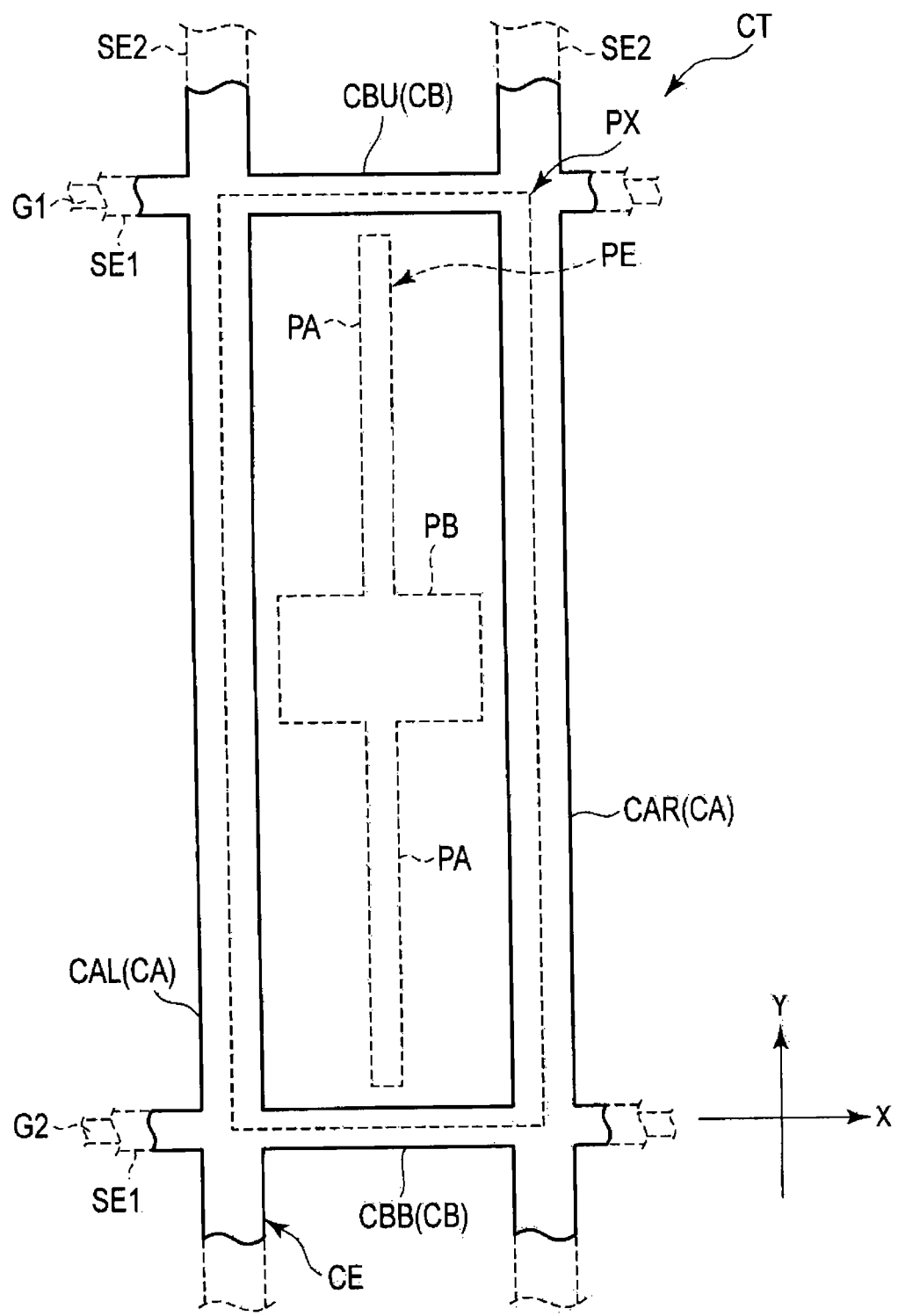
FIG. 9 is a plan view schematically showing a structure of the counter substrate according to a fourth embodiment.

FIG. 9 is a plan view schematically showing a structure of the counter substrate according to a fourth embodiment. The counter substrate CT is further equipped with a sub-common electrode CB which constitutes the common electrode CE. That is, the common electrode CE is equipped with the sub-common electrode CB formed integrally or continuously with the main common electrode CA above the gate line G in a belt shape and extending along the first direction X. In this embodiment, the counter substrate CT is equipped with a sub-common electrode CBU arranged at the upper end of the pixel PX and a sub-common electrode CBB arranged at the bottom end of the pixel PX. The sub-common electrode CBU is located above the gate wiring G1 facing the first shield electrode SE1, and the sub-common electrode CBB is located above the gate wiring G2 and facing the first shield electrode SE1. When the counter substrate CT including the main common electrode CA and the sub-common electrode CB is applied, the pixel electrode PE is arranged inside surrounded with the common electrode CE in the lattice shape. The array substrate AR combinable with the above common electrode CT is not limited to that shown in FIG. 2 but may be that shown in FIG. 7.

As explained above, according to this embodiment, it becomes possible to supply the liquid crystal display which can control degradation of display grace.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
   a first substrate including:
      a gate line and an auxiliary capacitance line respectively extending in a first direction,
      a source line extending in a second direction orthogonally crossing the first direction,
      a switching element electrically connected with the gate line and the source line,
      a pixel electrode including a main pixel electrode electrically connected with the switching element and extending in the second direction in the shape of a belt,
      a first alignment film covering the pixel electrode, and
   a second substrate facing the first substrate and including:
      a common electrode having a pair of main common electrodes arranged on both sides sandwiching the main pixel electrode and extending in the second direction,
      a second alignment film arranged facing the first alignment film; and
   a liquid crystal layer held between the first alignment film and the second alignment film and including liquid crystal molecules; wherein
   the liquid crystal layer is formed of materials having negative dielectric constant anisotropy, and the liquid crystal molecules are initially aligned substantially in parallel with the first direction.

2. The liquid crystal display device according to claim 1, further comprising a first polarization plate arranged on an outer surface of the first substrate and including a first polarizing axis and a second polarization plate arranged on an outer surface of the second substrate and including a second polarizing axis in a Cross Nicol positional relation with the first polarizing axis, and the first polarizing axis of the first polarization plate is arranged in parallel with or orthogonally crossing the initial alignment direction of the liquid crystal molecules.

3. The liquid crystal display device according to claim 1, wherein the pixel electrode includes a sub-pixel electrode arranged on the auxiliary capacitance line, connected with the main pixel electrode and extending in the first direction.

4. The liquid crystal display device according to claim 1, wherein the first substrate includes a first shield electrode arranged facing the gate line and covered with the first alignment film and a second shield electrode arranged facing the source line and covered with the first alignment film, and the first and second shield electrodes are set to the same electric potential.

5. The liquid crystal display device according to claim 1, wherein the dielectric constant anisotropy of the liquid crystal layer is −10 or less.

6. A liquid crystal display device constituted by a plurality of pixels arranged in a matrix, comprising:
a first substrate including:
a first gate line and a second gate line respectively extending in a first direction,
an auxiliary capacitance line extending in the first direction at a substantially center portion between the first gate line and the second gate line,
a first source line and a second source line extending in a second direction orthogonally crossing the first direction,
a switching element electrically connected with the first gate line and the first source line,
a pixel electrode including a main pixel electrode electrically connected with the switching element and extending in the second direction in the shape of a belt between the first source line and the second source line, and a sub-pixel electrode arranged on the auxiliary capacitance line and connected with the main pixel electrode, the sub-pixel electrode extending in the first direction between the first source line and the second source line,
a first alignment film covering the pixel electrode, and
a second substrate arranged facing the first substrate and including:
a common electrode having a pair of main common electrodes arranged on both sides sandwiching the main pixel electrode and extending in the second direction,
a second alignment film arranged facing the first alignment film; and
a liquid crystal layer held between the first alignment film and the second alignment film and including liquid crystal molecules; wherein
the liquid crystal layer is formed of materials having negative dielectric constant anisotropy, and the liquid crystal molecules are initially aligned substantially in parallel with the first direction.

7. The liquid crystal display device according to claim 6, wherein the main pixel electrode is arranged substantially in the center between the first source line and the second source line.

8. The liquid crystal display device according to claim 6, wherein the distance between the main pixel electrode and the first source line along the first direction is smaller than the distance between the main pixel electrode and the second source line along the first direction.

9. The liquid crystal display device according to claim 8, wherein each pixel includes a first transmissive region surrounded by the first source line, first and second gate lines and the main pixel electrode, and a second transmissive region surrounded by the second source line, first and second gate lines and the main pixel electrode, and the area of the first transmissive region is smaller than that of the second transmissive region.

10. The liquid crystal display device according to claim 9, wherein
the first transmissive region is set to a region for compensating an assembling shift between the first and second substrates, and the second transmissive region is set to a region for mainly contributing to display in the pixel.

11. A liquid crystal display device, comprising:
a first substrate including:
a gate line and an auxiliary capacitance line respectively extending in a first direction,
a source line extending in a second direction orthogonally crossing the first direction,
a switching element electrically connected with the gate line and the source line,
a pixel electrode including a main pixel electrode electrically connected with the switching element and extending in the second direction in the shape of a belt,
a first alignment film covering the pixel electrode, and
a second substrate arranged facing the first substrate and including:
a common electrode having a pair of main common electrodes arranged on both sides sandwiching the main pixel electrode and extending in the second direction,
a second alignment film arranged facing the first alignment film; and
a liquid crystal layer held between the first alignment film and the second alignment film and including liquid crystal molecules; wherein
the liquid crystal layer is formed of materials having negative dielectric constant anisotropy, and the liquid crystal molecules are initially aligned substantially in parallel with the first direction,
the liquid crystal display device further comprises a first polarization plate arranged on an outer surface of the first substrate and including a first polarizing axis and a second polarization plate arranged on an outer surface of the second substrate and including a second polarizing axis in a Cross Nicol positional relation with the first polarizing axis, and the first polarizing axis of the first polarization plate is arranged in parallel with or orthogonally crossing an initial alignment direction of the liquid crystal molecules,
the pixel electrode includes a sub-pixel electrode connected with the main pixel electrode, arranged on the auxiliary capacitance line and extending in the first direction,
the first substrate includes a first shield electrode arranged facing the gate line and covered with the first alignment film and a second shield electrode arranged facing the source line and covered with the first alignment film, and the first and second shield electrodes are set to the same electric potential.

* * * * *